United States Patent

Leroy et al.

[11] 4,065,159
[45] Dec. 27, 1977

[54] ROTARY CONNECTOR

[75] Inventors: Pierre Leroy, Saint-Germain-en-Laye; Emile Sprunck, Moyeuvre-Grande, both of France

[73] Assignees: E. Sprunck, Moyeuvre-Grande; Creusot-Loire, Paris, both of France

[21] Appl. No.: 647,766

[22] Filed: Jan. 9, 1976

[30] Foreign Application Priority Data

Jan. 22, 1975 France ............................. 75.01925

[51] Int. Cl.² ............................................ F16L 27/08
[52] U.S. Cl. ................................ 285/136; 285/281; 285/190
[58] Field of Search ............. 285/190, 134, 136, 272, 285/273, 274, 275, 281; 417/171

[56] References Cited

U.S. PATENT DOCUMENTS

| 1,838,740 | 12/1931 | Burnham | 285/190 X |
| 2,659,615 | 11/1953 | McClain | 285/190 X |
| 2,781,055 | 2/1957 | Jackson | 285/281 X |
| 3,943,961 | 3/1976 | Knapp | 285/281 |

FOREIGN PATENT DOCUMENTS 1,183,872  2/1959  France ............................. 285/281

Primary Examiner—Dave W. Arola
Attorney, Agent, or Firm—Haseltine, Lake & Waters

[57] ABSTRACT

A rotary connector for connecting a fixed pipe to a movable pipe for fluid flow therebetween comprising a cylindrical stator having an input for supplying fluid thereto tangentially of the axis of the stator and adapted to be coupled to the fixed pipe, and a rotor rotatable about the axis of said stator and having an output extending in a direction perpendicular to the plane of said tangential input and connectable to the movable pipe, the rotor comprising a plurality of demountable parts. The rotor may comprise two main body parts which are received within the stator and abut oppositely directed shoulders on the stator, the parts having opposed spaced faces between which the inlet opens and which are shaped to direct the fluid axially into the outlet in one of the parts, the two parts being releasably fixed together.

12 Claims, 4 Drawing Figures

ROTARY CONNECTOR

FIELD OF THE INVENTION

The present invention concerns a rotary connector for connecting at least one fixed pipe to at least one movable pipe for ensuring the flow of at least one fluid from at least one fixed pipe to a movable pipe with good fluidtightness at all points of the circuit or circuits. It is particularly but not applicable to the feeding of a refinement converter with refining, stirring, scouring or diluent fluids.

BACKGROUND

There are numerous known devices enabling a fluid to flow from a fixed pipe to a movable pipe and ensuring good fluidtightness. However, in a certain number of cases they do not give entire satisfaction.

Thus, in the case of a bottom-blast steelwork converter, which tilts about two trunnions, at least one of its two trunnions is hollow and the feed pipes for the fluids necessary for the refinement of the metal bath, for stirring it, for the dilution of the carbon monoxide, for scouring the blastpipes, or for protection of the pipes against hot wear, pass through the hollow trunnion or trunnions.

Certain of these fluids may contain powdery materials (lime, limestone flux, carbon, mineral, etc...) which are more or less abrasive.

The known rotary connectors when new operate in general in a fairly satisfactory way but in the long term they display the following disadvantages:

a. When they are worn they exhibit no precursory sign of wear and at the ultimate stage they break through suddenly, thus bringing about leakage of substantial amounts of fluids and requiring sudden stop of the metallurgical operation of refinement.

b. They include no wearing part and after wear they must be replaced entirely.

c. They are not suited to the use of powdery materials in suspension in the fluids employed.

Another disadvantage of known rotary connectors is that they have to be arranged in a straight-line pipe, which means that only one large pipe and hence only one main fluid can be admitted per hollow trunnion.

SUMMARY OF THE INVENTION

According to the present invention there is provided a rotary connector for connecting a fixed pipe to a movable pipe for fluid flow therebetween, the connector comprising a cylindrical stator having an input for supplying fluid thereto tangentially of the axis of said stator and adapted to be coupled to the fixed pipe, and a rotor rotatable about the axis of said stator and having an output extending in a direction perpendicular to the plane of said tangential input and connectable to the movable pipe, the rotor comprising a plurality of demountable parts.

In one embodiment, said stator is provided, on its inner surface, with oppositely directed shoulders and said rotor comprises first and second main bodies received by said stator and abutting the respective shoulders on said stator, said bodies having spaced opposed faces between which said inlet opens and which are shaped to cause fluid to flow in the direction of said axis, said output being formed in said second body, means for releasably connecting said first body to the second body and means for sealing the joint between said first and second bodies and said stator.

In the case where one needs to introduce two distinct and separate fluids into two different pipes feeding one and the same movable member, for example, a steel converter which receives, on the one hand, pure oxygen and, on the other hand, nitrogen for stirring or argon for dilution or steam for dilution, etc.., a connector assembly can be used comprising two coaxial connectors as described above, but in which the second main body of the first connector is formed integrally with the first main body of the second connector, the outlet of the first connector extending through the main bodies of the second connector and being offset from the axis as it passes through the second main body of the second connector.

In general, for a plurality of fluids, the connector assembly comprises a plurality of coaxial connectors as described above, but in which the second main body of each connector is formed integrally with the first main body of the adjacent connector, connections of the movable pipes to the assembly being offset one with respect to another.

BRIEF DESCRIPTION OF THE DRAWING

The invention will be more fully understood from the following description of two embodiments thereof, given by way of example only, with reference to the accompanying drawings, in which.

Figure 2:
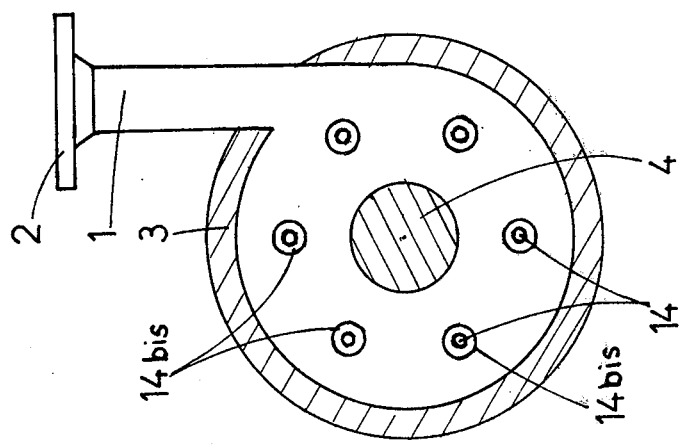
FIG. 2 is a transverse section taken along line AA' in FIG. 1.

The transverse section along CC' of the second embodiment is the same as that shown in FIG. 2.

DETAILED DESCRIPTION

Figure 1:
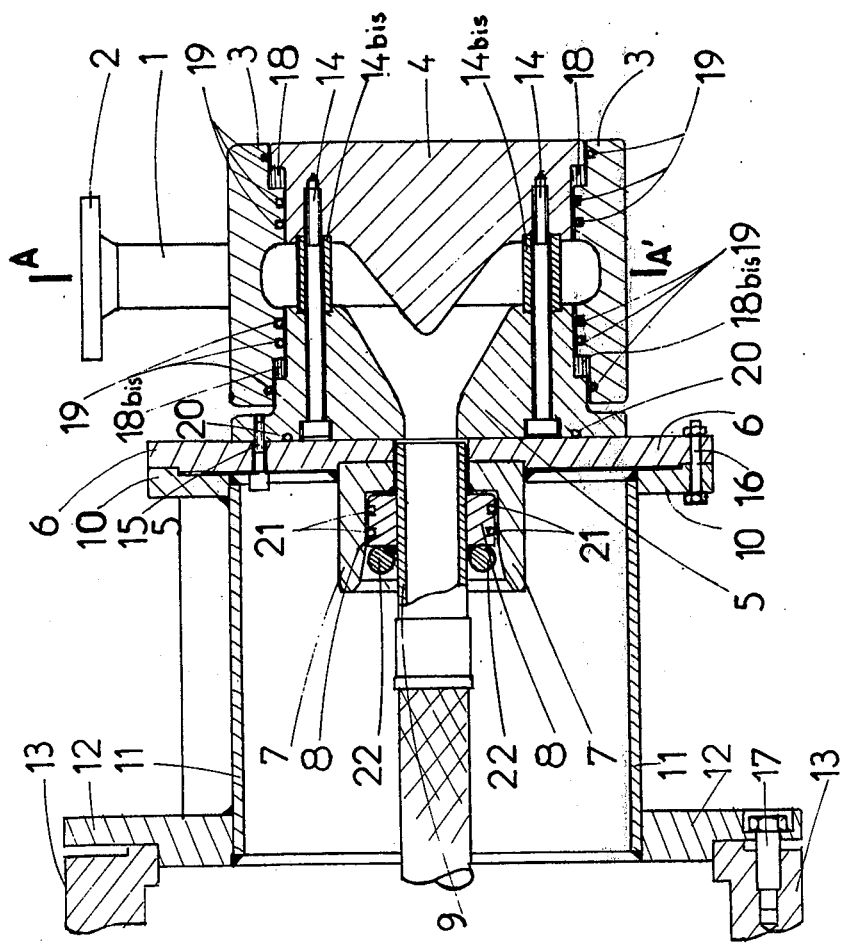
FIG. 1 is a longitudinal section through a first embodiment according to the invention.

The first connector shown in FIGS. 1 and 2 is adapted for a single fluid which enters the connector through a pipe 1 connected to a network of pipes by a flange 2.

The pipe 1 opens into a stator 3 having the form of a fixed cylindrical part which is fed tangentially by the fixed pipe 1. The stator has on its inner face two antifriction rings 18, 18b is of Teflon or other antifriction material, such as Viton or an antifriction resin, forming oppositely directed shoulders and six fluid-tight sealing rings such as 19 arranged in grooves.

A rotor is received by the stator and comprises parts 4, 5, 6, 7, 8 (integral with a pipe 9 to be fed), 10, 11 and 12 which are fixed together by means of bolts and welds. The first part 4 of the rotor is provided with a shoulder which abuts the ring 18 of the stator 3. It is domed at its center as indicated in FIGS. 1 and 2 so that the fluid follows a spiral motion in the direction of the pipe 9 to be fed.

The second part 5 of the rotor is provided with a shoulder which abuts the second ring 18b is of the stator 3. It is hollowed out and profiled at its center in order to channel the fluid stream between it and the come on the first part towards the pipe 9 to be fed. Part 5 is secured to the first part 4 by means of six bolts 14, each surrounded by a sheath 14b is over that portion of its length which is in contact with the fluid. Tightening of these six bolts is regulated in dependence on the contact force that is required to be exerted against the two Teflon rings 18 and 18b is.

The part 6 is a baseplate which is provided with a central aperture to receive the end of the pipe 9 and is fixed to the second part 5 of the rotor by means of seven bolts 15. Fluid-tightness between the part 5 and the plate 6 is ensured by a sealing ring 20.

Centrally of the plate 6 and around its central aperture is welded a collar 7 which is hollowed out as shown in FIG. 1.

In its hollow, the collar 7 receives a thick metal ring 8 which is welded to the pipe 9. On its outer cylindrical face the ring 8 is provided with two circular grooves receiving two sealing rings 21, creating a fluid-tight joint between the collar 7 and the metal ring 8.

The unit formed by the ring 8 and the pipe 9 is fixed to the collar 7 by two pins 22 which extend tangentially to the ring 8 and pass through the collar 7 which is suitably drilled to receive these two pins.

At a certain distance away and around the collar 7 and pipe 9 is arranged a metal drum 11 welded to two flanges 10, 12. The first flange 10 is attached to the baseplate 6 by seven bolts 16, and the second flange 12 is attached by bolts 17 to a part 13 fixed to the converter. This drum has an access opening not shown in FIG. 1.

For dismantling the assembled rotary connector, it is sufficient to remove the two pons 22, unscrew the seven bolts 16 and the bolts in the flange 2, in order to be able to withdraw the assembly which is then dismantled in the following order:

a. bolts 15 are unscrewed, and
b. bolts 14 are unscrewed.

Thus the dismantling is extremely quick. Reassembly is equally quick and is of course carried out in the reverse order.

Figure 3:
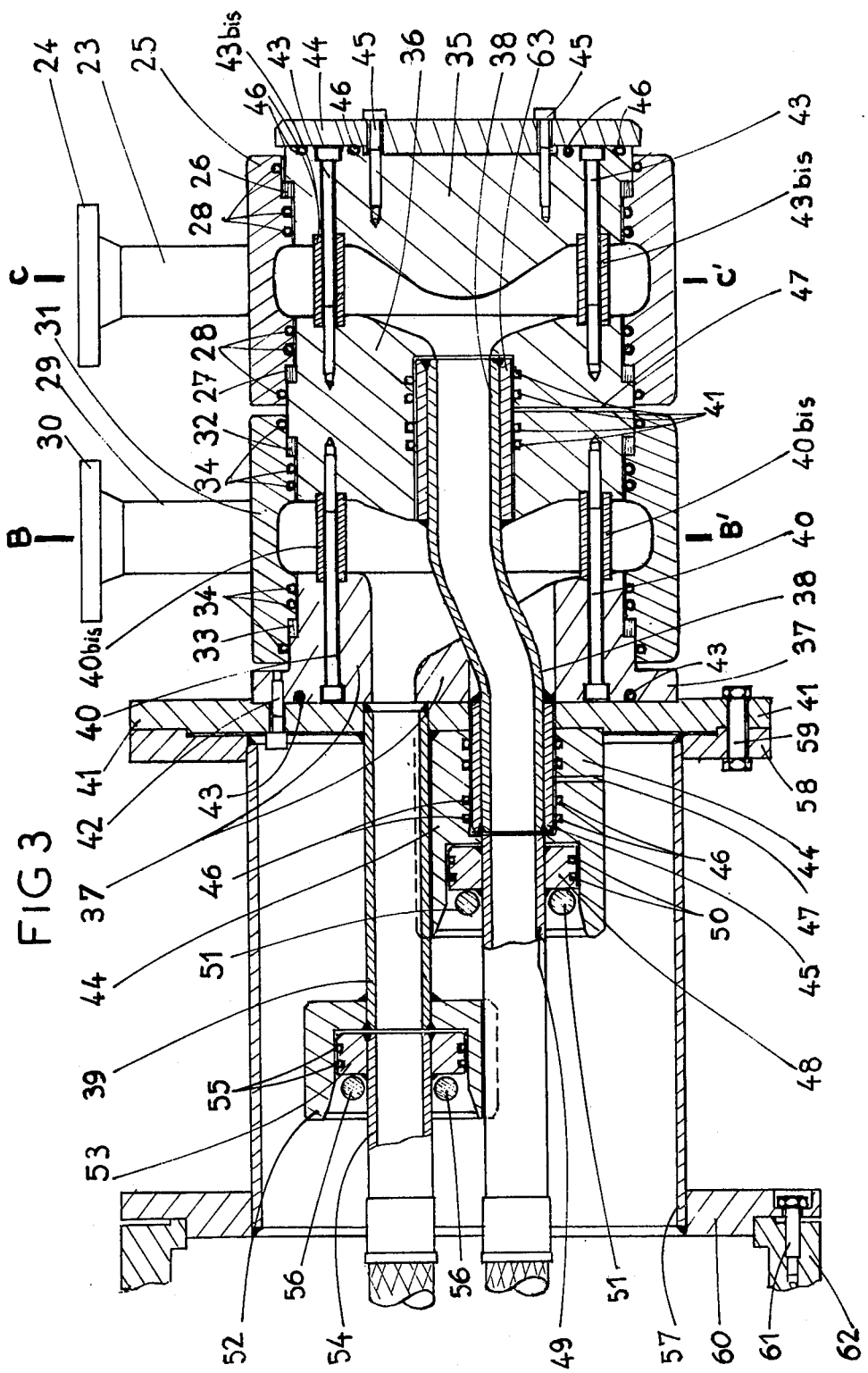
FIG. 3 is a longitudinal section through a second embodiment.
Figure 4:
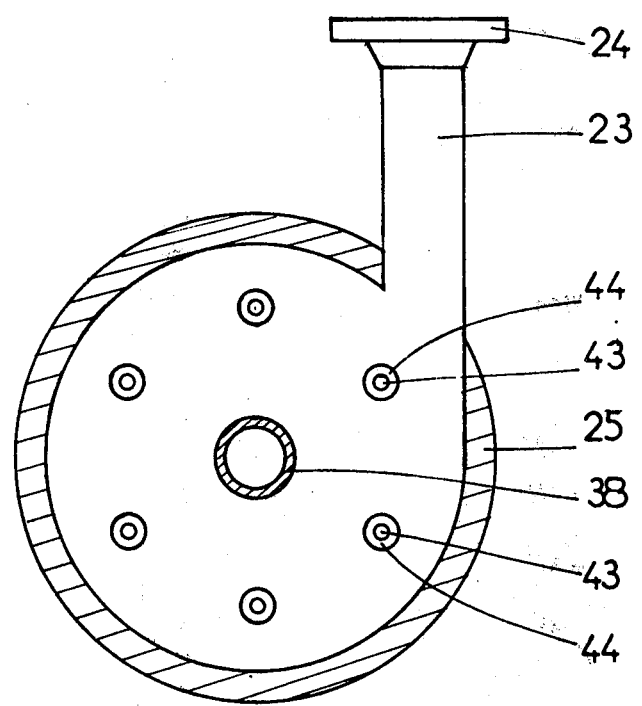
FIG. 4 is a transverse section taken along line BB' in FIG. 3.

The second embodiment, for two fluids, is shown in FIGS. 3, and 4.

The first fluid enters through fixed pipe 23 which is connected to a pipe network by flange 24 and feeds a fixed cylindrical stator 25 tangentially. The latter has on its inner face two Teflon rings 26 and 27 forming shoulders and six fluid-tight rings 28 arranged in grooves.

The second fluid comes in through fixed pipe 29 which is connected to the network by flange 30 and feeds a fixed cylindrical stator 31 tangentially. The latter has on its inner face, like the stator 25, two Teflon rings 32 and 33 forming shoulders, and six fluid-tight rings 34 arranged in grooves.

The rotor comprises an assembly of parts fixed together by means of bolts and welds. This complex rotor constitutes the equivalent of a simple rotor having two main parts 35 and 36 for the first fluid and a simple rotor having two main parts 36 and 37 for the second fluid, the second part 36 of the first rotor being the same as the first part 36 of the second rotor.

More precisely, the first main part 35 of this rotor is fitted with a shoulder abutting the ring 26 on the stator 25. It is domed at its center as indicated in FIG. 3 so that the first fluid follows a spiral path in the direction of a pipe 38 which is slightly deflected in order to be sufficiently offset from a pipe 39 for the second fluid.

The second main part 36 of the rotor is fitted with a shoulder abutting the Teflon ring 27 on the stator 25 and abutting the Teflon ring 32 on the stator 31. It is profiled on that face directed towards the first part 35 in order to channel the stream of first fluid between this profiled face and the dome on the first part. It is domed on that face directed towards the third main part 37 so that the second fluid follows a spiral path in the direction of the second pipe 39. Finally it is hollowed out at its center to receive pipe 38 for the first fluid. The upstream end of this pipe 39 is reinforced externally over a short length by a metal sheath 63 which is welded to it and which passes with a very small clearance into the central hollow in the second main part 36 of the rotor. Fluid-tightness between this sheath 63 and the hollow in the part 36 is ensured by four rings 41 arranged in grooves in the part 36. Between the two center rings 41 is arranged a vent 47 (FIG. 3) releasing fluid at overpressure into a circular channel of small size not shown in FIG. 3 and machined in the part 36.

The second main part 36 of the rotor is fixed to the first part 35 by means of six bolts 43 each surrounded by a sheath 43bis. In service, the heads of these six bolts 43 are protected by a plate 44 attached to the part 35 by six bolts 45, fluidtightness between stator 25 and plate 44 being ensured by two rings 46.

The third main part 37 of the rotor is fitted with a shoulder abutting the second Teflon ring 33 on the stator 31. It is hollowed out and profiled in a manner which is moreover off-center in order to provide sufficient clearance between the two pipes 38 and 39 for the two fluids and its hollowed profile is matched to the dome on that face of the second part 36, which is turned towards it, in order to channel the stream of the second fluid towards the pipe 39.

This third main part 37 is fixed to the second 36 by means of six bolts 40, each surrounded by a sheath 40bis over the portion of their length which is in contact with the second fluid.

A baseplate 41, provided with two apertures for the pipe 38 for the first fluid, and to receive the end of the pipe 39 for the second fluid, is fixed to the third main part 37 of the rotor by means of seven bolts 42. Fluid-tightness between the part 37 and the plate 41 is ensured by a sealing ring 43.

To the plate 41 and around its first aperture is welded a first collar 44 which in turn is hollowed out twice as shown in FIG. 3. A first hollow, facing upstream, receives the downstream end of the tube 38 which is reinforced externally over a short length by a metal sheath 45 which is welded to it and passes with a small clearance into this first hollow in the collar 44. Fluid-tightness between this sheath 45 and its seating is ensured by four sealing rings 46 arranged in grooves in the collar 44. Between the two center rings 46 is arranged a vent 47 releasing fluid at overpressure into a circular channel of small size not shown in FIG. 3 and machined in the collar 44.

The second hollow in the collar 44, facing downstream, receives a thick metal ring 48 welded to a pipe 49 which is to be fed with the first fluid. On its outer cylindrical face the ring 48 is provided with two circular grooves provided with two sealing rings 50, providing fluid-tightness between the collar 44 and the metal ring 48. The unit formed by the ring 48 and the pipe 49 is fixed in the collar 44 by two pins 51 which extend tangentially to the ring 48 and pass through the collar 44 which is suitably drilled to receive these two pins.

The upstream end of the pipe 39 which receives the second fluid is welded to the baseplate 41. To the downstream end is welded a collar 51 having a hollow facing downstream. This hollow receives a thick metal ring 43 welded to the upstream end of a pipe 54 which is to be fed with the second fluid. As in the case of the ring 48 the thick ring 53 is provided on its outer cylindrical face with two circular grooves provided with two sealing rings 55, providing fluidtightness between the collar 52 and the ring 48. The unit formed by the thick ring 53 and the pipe 54 is fixed in the collar 52 by two pins 56 which extend tangentially to the ring 53 and pass through the collar 52 which is suitably drilled to receive these two pins.

At a certain distance away and around the two pipes 49 and 54 and their respective collars 44 and 52 is arranged a metal drum 57 furnished with an access opening and welded to two flanges 58, 60. The first flange 58 is attached to the baseplate 41 by seven bolts 59 and the second flange 60 is attached by bolts 61 to a part 62 fixed to the converter.

For dismantling this rotary connector, it is sufficient first of all to remove the two pins 51 and the two pins 56, unscrew the bolts 59 and unscrew the bolts from the flanges 24 and 30 in order to withdraw the rotary seal device which is then dismantled in the following order:
  a. the bolts 42 are unscrewed,
  b. the bolts 40 are unscrewed,
  c. the bolts 45 are unscrewed, and
  d. the bolts 43 are unscrewed.

Each part is therefore separately recovered, and dismantling is very quick. Reassembly is likewise very quick and is of course carried out in the reverse order.

The maintenance program for the above described rotary connectors may comprise periodic replacement of wearing parts; each wearing part may have its own replacement period as a function of its own rate of wear. All parts subjected to heavy abrasion or wear are, of course, made of a hard material such as basalt, corundum, quartz, stellites, etc.

It will be appreciated that the second embodiment for the admission of two fluids can be easily modified to provide for the admission of a plurality of fluids greater than two.

There are thus provided rotary connectors which are easy to take apart and put together, include wearing parts for replacement periodically before being completely worn out, are well suited to use with fluids including powdery materials in suspension, and enable more than one main pipe to be passed through a single hollow converter trunnion.

Because of the ease with which the connector can be taken apart, it is possible periodically to change preventively a part of the connector, depending upon its rate of wear, before that part has reached a state of excessive wear, as is the case with known rotary seals. In particular, when powders in suspension in a gas are used, the parts subjected to the abrasion caused by these powders may be changed in good time or else consist of abrasion-resistant materials.

What is claimed is:

1. A rotary connector for connecting a fixed pipe to a movable pipe for fluid flow therebetween, the connector comprising a cylindrical stator having an inlet for supplying fluid thereto tangentially of the axis of said stator and adapted to be coupled to the fixed pipe, and a rotor projecting within said stator and rotatable about the axis of said stator, said rotor having an outlet extending in a direction perpendicular to the plane of said tangential inlet and connectable to the movable pipe, the rotor comprising a plurality of demountable parts, said stator having an inner surface and being provided, on its inner surface, with oppositely directed shoulders, said rotor comprising first and second main bodies received by said stator and abutting the respective shoulders on said stator, said bodies having spaced opposed faces between which said inlet opens and which faces are shaped to cause fluid to flow in the direction of said axis, said outlet being formed in said second body, means for releasably connecting said first body to the second body and means for sealing the joint between said first and second bodies and said stator.

2. A connector as claimed in claim 1, wherein parts of the connector subjected to heavy abrasion are made of a hard material selected from the group consisting of basalt, corundum, and stellites.

3. A connector assembly for connecting two fixed pipes to two movable pipes for independent fluid flow therebetween, the connector assembly comprising a pair of coaxial rotary connectors according to claim 1, wherein the second main body of the first connector is formed integrally with the first main body of the second connector, the outlet of the first connector extending through the main bodies of the second connector and being offset from the axis as it passes through the second main body of the second connector.

4. A connector assembly for connecting a plurality of fixed pipes to a plurality of movable pipes for independent fluid flow therebetween, the connector assembly comprising a plurality of coaxial rotary connectors according to claim 1, wherein the second main body of each connector is formed integrally with the first main body of the adjacent connector, connections of the movable pipes to the assembly being offset with respect to one another.

5. A rotary connector for connecting a fixed pipe to a movable pipe for fluid flow therebetween, the connector comprising a cylindrical stator having an inlet for supplying fluid thereto tangentially of the axis of said stator and adapted to be coupled to the fixed pipe, and a rotor projecting within said stator and rotatable about the axis of said stator, said rotor having an outlet extending in a direction perpendicular to the plane of said tangential inlet and connectable to the movable pipe, the rotor comprising a plurality of demountable parts, said stator having an inner surface and being provided on its inner surface with two anti-friction rings forming oppositely directed shoulders and grooves receiving sealing rings, said rotor comprising a first main body of revolution which abuts a first one of said anti-friction rings being remote from said outlet, a second main body of revolution which abuts the second one of said anti-friction rings on said stator, said first and second main bodies having spaced opposed faces between which said inlet opens, said face of said first main body having a central dome so as to guide fluid towards said second main body, said face of said second main body being hollowed and shaped correspondingly to said dome, said outlet being provided in said second main body, a baseplate provided with a central aperture for communicating with the fixed pipe and communicating with said outlet; first releasable means for fixing said first and second main bodies together and second releasable means for fixing said baseplate to said second main body.

6. A connector according to claim 5, wherein said releasable means comprises bolts, the bolts connecting said first and second main bodies being provided with sheaths over that portion of their length which will be in contact with the fluid.

7. A connector according to claim 6, wherein six bolts connect said first and second main bodies.

8. A connector according to claim 7, wherein the stator is provided with at least four grooves receiving sealing rings.

9. A connector according to claim 8, wherein the stator is provided with six grooves receiving sealing rings.

10. A connector according to claim 5, including a collar welded to said baseplate and adapted to receive a thick metal ring welded to the movable pipe and provided on its outer cylindrical face with at least one groove provided with a sealing ring for ensuring fluid-tightness between said ring and said collar, the unit formed by said movable pipe and the ring being adapted to be rigidly fixed to said collar by means of two pins extending tangentially across an end face of said ring and passing through said collar and, surrounding with clearance the movable pipe and said collar, a metal drum having a flange welded to each of its ends, a first one of said flanges being fixed to said baseplate by a plurality of bolts, and the second one of said flanges being attached by bolts to a part of a movable member which receives fluid from said movable pipe.

11. A connector as claimed in claim 10, including vents open to the atmosphere and communicating with channels in the inner faces of the main bodies of the rotor and the collar for releasing excess fluid pressure.

12. A connector as claimed in claim 5, wherein the anti-friction rings are made of a material selected from the group consisting of polytetrafluoroethyne, Viton, and anti-friction resins.

* * * * *